Sept. 17, 1963

J. T. SALIHI 3,104,373

SELECTIVE FREQUENCY DETECTOR

Filed May 20, 1959

INVENTOR.
JALAL T. SALIHI
BY
Lippincott & Ralls
ATTORNEYS

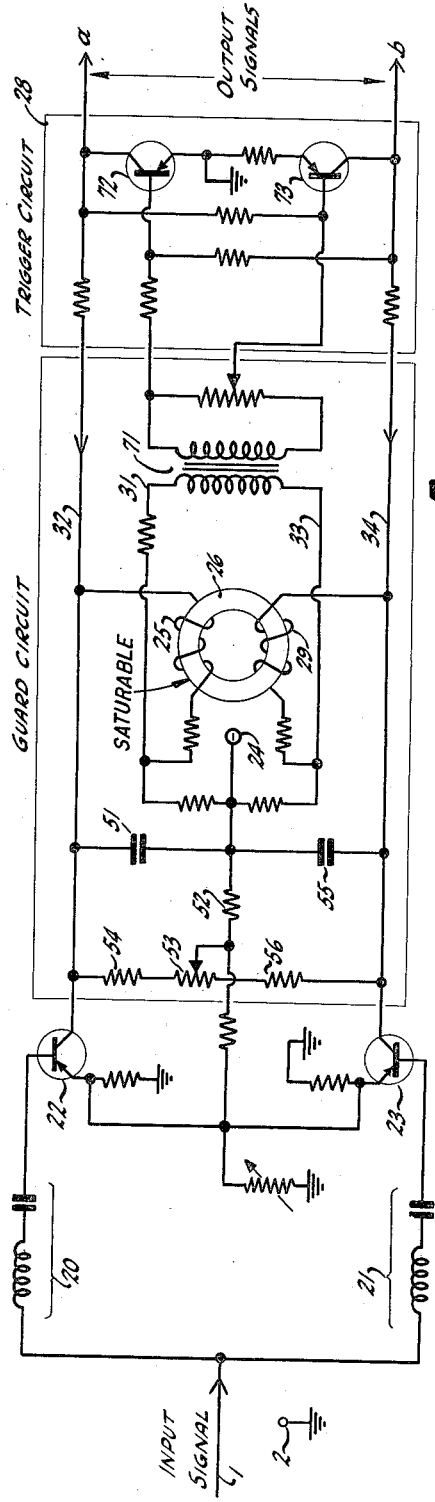
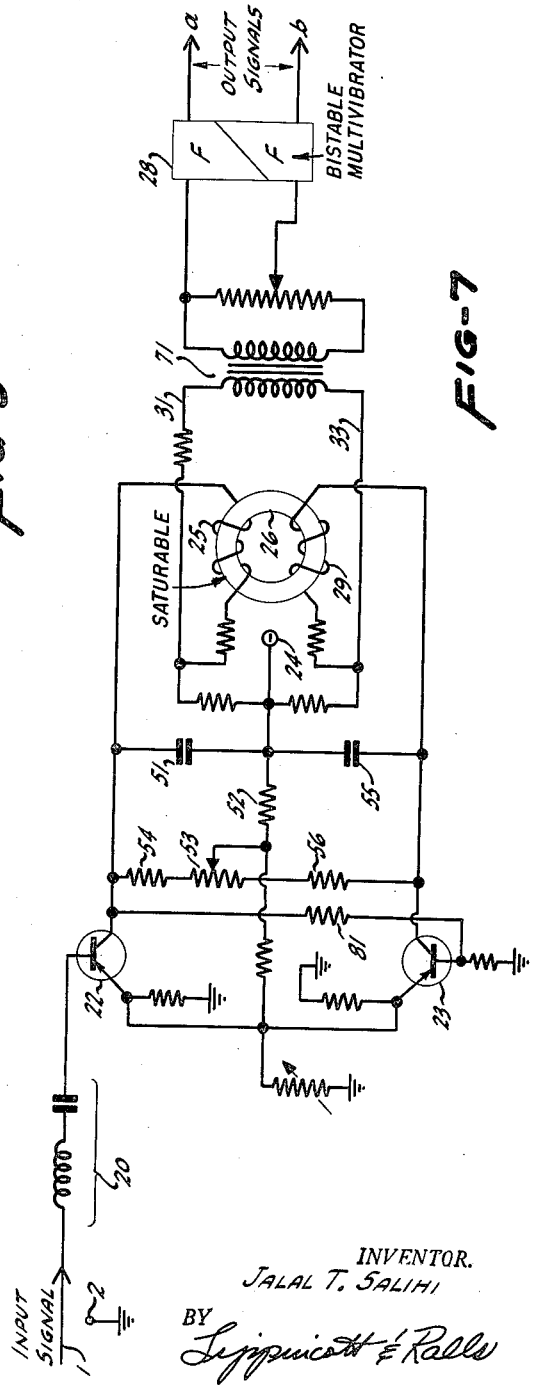

United States Patent Office 3,104,373
Patented Sept. 17, 1963

3,104,373
SELECTIVE FREQUENCY DETECTOR
Jalal T. Salihi, San Carlos, Calif., assignor to Lenkurt Electric Company, Inc., San Carlos, Calif., a corporation of Delaware
Filed May 20, 1959, Ser. No. 814,526
5 Claims. (Cl. 340—147)

This invention relates to frequency detectors and, more particularly, to frequency detectors employing saturable cores.

An object of the present invention is to provide frequency selective circuits that are simple in operation, economical to manufacture and maintain, and sharply selective. Another object is to provide frequency sensitive circuits in which the guarding action that prevents false operation is obtained by using a time-delay and a memory.

In conventional frequency detecting or frequency selective systems, a parallel resonant circuit is employed to detect a signal of preselected frequency. Often, this signal circuit cooperates with a guard channel that includes a series resonant circuit proportioned to generate a signal as a result of all frequencies other than the desired one. These two signals are subtracted, thus the series tuned circuit "guards" or tends to peak the response characteristic of the parallel resonant circuit tuned to the preselected frequency. With this type of arrangement, a 6–10 db improvement in selectivity is obtainable in some cases. An inband signaling system employing this guard channel technique is described in an article appearing in the Bell System Technical Journal, November 1954, by A. Weaver and N. A. Newell. While the guard channel action of systems similar to the one disclosed therein represents a distinct improvement over a tuned circuit alone—which can never be so sharply tuned as to preclude closely adjacent frequency signals from being passed—as an ideal it still leaves something to be desired.

The present invention overcomes not only the disadvantages of an unguarded tuned circuit but represents a substantial improvement in frequency selective circuits in general. While the frequency selective circuit of the present invention utilizes a tuned series circuit to eliminate all but the immediately adjacent frequencies surrounding a desired frequency, it does not employ a guard circuit to generate a bucking voltage dependent on excluded frequencies. Rather, the instant invention employs the time delay inherent when a saturable core shifts from a magnetically saturated state of one polarity to that of the other to detect and guard the frequency selective circuit. Thus, the time delay prevents precipitant action when the presence of the desired frequency is short. Beyond this, memory means are used in some cases to maintain the saturable core in its shifted position.

The relatively square hysteresis loop of certain saturable cores suits them for switching applications, and the present invention takes advantage of this characteristic, and of the fact that it requires a predetermined time to shift a saturable core, i.e., to effect the switching requires that the flux in the core build up. The time delay required to shift a core from a saturated state of one polarity to that of the other is utilized in cooperation with tuned circuits to provide a means for detecting a preselected frequency when it is one of many present. Beyond this, means is provided in some multifrequency applications to maintain the core in its shifted saturated condition until such time as another signal, generated by another frequency, is detected. The latter causes the core to reset to its original saturated condition.

In one preferred embodiment of the present invention the frequency detector is arranged to detect the presence of one of two frequencies, and to this extent represents systems which might be incorporated into dual frequency inband signaling systems. Such a system is broadly disclosed in the copending application of Henry G. Kuhn, Serial No. 808,709, filed April 24, 1959, disclosing and claiming an Inband Signaling System, and more narrowly in my copending application for Inband Signaling System, Serial No. 814,597, now Patent No. 2,971,062, filed on an even date herewith.

Thus, a few of the exemplary embodiments of the frequency detector herein proposed employ pairs of tuned series circuits each of which actuates a switch, preferably a transistor or other high-speed electronic switching device. The switches in turn cooperate with at least one saturable core to provide distinct output pulses. Whenever one of the two selected frequencies is detected by its series resonant circuit, it operates its cooperating switch thereby causing the saturable core to shift from one saturation state to the other, provided the signal of preselected frequency is sufficiently long to overcome the time delay built into the saturable core.

In dual frequency detectors, such as might be incorporated into dual frequency inband signaling systems, as well as in other frequency selective applications, it is desirable that the frequencies to be detected be chosen as close together as possible since this improves the guarding action of the saturable core circuit. This improvement arises from the fact that in the presence of random noise and other non-signal disturbances (including voice), probability favors alternation between closely adjacent frequencies. This alternation between the frequencies nullifies partial flux buildup in the saturable core which is not due to a sustained signal of one of the preselected frequencies. While an exemplary embodiment of the present invention may be used in dual frequency signaling systems, as disclosed and claimed in my copending application, it is in no way limited to such a use.

In another embodiment of the invention, the frequency detector is biased normally to a saturated state of one polarity in order to function properly in response to a single frequency. This latter detector might operate in connection with a single frequency inband signaling system as disclosed in the Weaver and Newell article or in other applications. More broadly, of course, the concept of using the time delay of a saturable core and means responsive to a particular saturated state of the core can be extended to any number of cores cascaded to handle a variety of unique frequencies.

Therefore, a feature of this invention, pertains to the use of a saturable core incorporated into a guard circuit for a multi-frequency detector.

Another feature of the invention pertains to the cooperation of one or more series resonant circuits, tuned to preselected frequencies, cooperating with switches responsive thereto and at least one winding upon a saturable core to provide an output pulse which is unique to and correlatable with the preselected frequency at the input.

Yet another feature of the present invention pertains to the cooperation of at least one series resonant circuit tuned to a preselected frequency, a switch operable thereby, a saturable core having a square hysteresis loop and at least one winding thereon to provide a pulse unique to that input frequency, and means to return the saturable core to its original saturated state.

More narrowly, a feature of the invention pertains to the combination of at least two series resonant circuits tuned to a pair of preselected frequencies, transistor switching means independently responsive to the flow of current in each of the tuned circuits, saturable core means selectively responsive to the closure of the switches associated with the tuned circuits to produce unique output pulses, and means responsive to output pulses to bias the saturable core to remain saturated in either polarity.

These and other objects and features of the invention will be more fully understood when the following description is read with reference to the drawing in which:

FIG. 5 is a detailed circuit diagram of the exemplary embodiment of FIG. 2;

FIG. 7 is a detailed circuit diagram of an exemplary embodiment for detecting a single frequency.

Figure 1A:
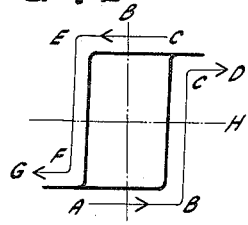
FIGS. 1a and 1b are B-H diagrams illustrating hysteresis loops of saturable cores of the preferred type.
Figure 1B:
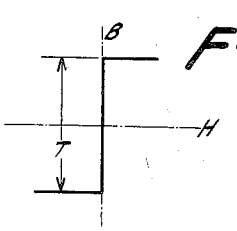

Before discussing in detail the various exemplary embodiments, it is well to look briefly at FIGS. 1a and 1b which illustrate the hysteresis loop of a saturable core employed in the circuits hereinafter described. FIG. 1a shows the actual shape of the hysteresis loop, which is substantially rectangular. FIG. 1b is an approximation thereof. As the core goes from its negatively saturated state to a positive one (for convenience, one arbitrarily selected direction of magnetization is herein called positive and the opposite direction is called negative), the flux buildup follows the path ABCD, and as the core goes from positive to negative saturation, it follows the path CEFG. To change from negative saturation to positive and vice versa requires a time T proportional to the change in flux (BC or EF) divided by the rate of change. If a positive voltage, for example (assuming positive voltage to be the voltage polarity that tends to shift the core toward the polarity of magnetic saturation herein called positive), is applied to a winding upon the saturable core but does not persist for a time exceeding T, the core will not fully "shift." Thus, it will return each time to its negatively saturated state. The reverse is true if the core is at a positive saturation and a negative voltage is applied to the winding. The time delay T, which it takes for a saturable core to shift from one state to the other, is taken advantage of in the present invention, as will be apparent from the following description of the exemplary embodiments.

Figure 2:
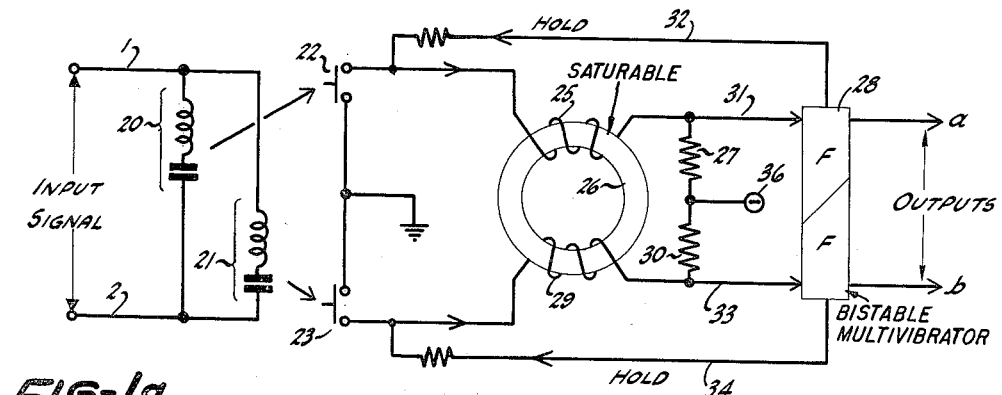
FIG. 2 is a schematic representation of a first exemplary embodiment of the present invention for detecting one of two frequencies.

Turning to FIG. 2, the exemplary embodiment includes a pair of series resonant circuits 20 and 21 tuned to frequencies $f_1$ and $f_2$, respectively. Each series resonant circuits 20 and 21 comprise an inductor and a capacitor, the combination of which is tuned to the respective frequencies $f_1$ and $f_2$. An input signal is applied across the resonant circuits 20 and 21 connected in parallel to conductors 1 and 2. The arrow between circuit 20 and switch 22 represents any operative relation such that current flow in circuit 20 actuates switch 22; and the arrow between circuit 21 and switch 23 represents a similar operative relation therebetween. A specific example of connections to achieve these operative relations is shown in FIG. 5.

Whenever a signal of frequency $f_1$ appears on conductors 1 and 2, current flows through the series resonant circuit 20 which in turn operates associated switch 22. Similarly, whenever a signal of frequency $f_2$ appears, current flows in resonant circuit 21 which actuates switch 23. When the switch 22 associated with series resonant circuit 20 is closed, ground is connected through switch 22 to one side of winding 25 of saturable core 26. The other terminal of winding 25 is connected through a dropping resistor 27 to the negative supply voltage terminal 36 and to one input of a bistable multivibrator, flip-flop, or trigger circuit 28. When the switch 23 associated with resonant circuit 21 is closed, ground is connected to one terminal of winding 29 upon the saturable core 26. The other terminal of winding 29 is connected through a dropping resistor 30 to negative supply voltage terminal 36 and to the other input of the bistable multivibrator 28.

The operation of the exemplary circuit of FIG. 2 is as follows: On the presence of an $f_1$ frequency signal, current flows in series resonant circuit 20 which operates switch 22 to complete a current path from battery 36 through switch 22 and winding 25 of saturable core 26 and resistor 27 to ground. Provided the current flowing in series resonant circuit 20 continues for a time sufficient to overcome the inherent time delay T of the saturable core 26, current will flow in winding 25 to operate the trigger circuit 28. While the core "shifts" from its negative to positive saturated condition, however, the changing magnetic flux in core 26 induces a back voltage which opposes the applied voltage and thus blocks the transmission of current to the trigger circuit 28. However, when the signal at the input of winding 25 persists for a time longer than the time delay T, current flows through the winding and a signal is transmitted via conductor 31 associated with one input of the trigger circuit 28. This triggers the flip-flop circuit 28 to one of its two stable conditions or states. The output current permitted to flow by the change in the saturated polarity of the core continues as long as the associated switch 22 is maintained closed. As soon as the frequency $f_1$ no longer causes current to flow through resonant circuit 20, the switch 22 reopens.

In a multi-frequency system it is desirable that core 26 be maintained in its shifted state until frequency $f_2$ apepars to complete a circuit through switch 23. That is, if the saturable core 26 has accidentally resaturated to its original negative condition, the closing of switch 23 will produce no substantial flux change because the core will remain in its negatively saturated condition. In this case, the core will not shift and no time delay will be provided—hence, there will be no guard action and trigger circuit 28 may change state responsive to a brief noise impulse at frequency $f_2$.

Means to maintain the core 26 in its shifted saturated condition consists of a "hold" feedback connection between the trigger circuit 28 and the input to winding 25. Thus, when the upper side (with respect to the drawing) of trigger circuit 28 is operated, as a result of current flowing in lead 31, it provides holding current over lead 32 to the winding 25 of the saturable core 26. With holding current flowing in lead 32, whenever switch 22 is opened after frequency $f_1$ disappears from the input terminals 1 and 2, saturable core 26 is maintained in its shifted saturated condition. It cannot reshift to its original position or drift. Now, whenever a signal of frequency $f_2$ appears on input conductors 1 and 2, current flows in series resonant circuit 21 which closes switch 23. This causes a current of opposite polarity (respecting the magnetizing force that it exerts on core 26) to flow in winding 29 of saturable core 26 after the time delay T, because windings 25 and 29 are connected in opposition. Provided the circuit through winding 29 is closed for a sufficient amount of time (in excess of delay T), a signal is transmitted to the lower input of the multivibrator through lead 33. Since lead 33 is an input to the lower section of trigger circuit 28, it causes the trigger circuit 28 to shift back to its initial state or condition. The shift of the trigger circuit 28 to its alternate stable condition provides a hold current over lead 34 for winding 29 of the saturable core 26 and interrupts the previous hold path over lead 32. The hold path over lead 34 maintains the saturable core in its reshifted saturated condition (negative) until series resonant circuit 20 next detects a burst of $f_1$ signal on conductors 1 and 2 that persists for a time exceeding delay T.

The bistable circuit 28 of the exemplary embodiment of FIG. 2 is any appropriate two-state device, such as a conventional bistable multivibrator, trigger or flip-flop circuit, and need not be disclosed in more detail. The only requirement is a bistable device which shifts to one state when current flows in lead 31 and shifts to its other state when current flows in lead 33. Any conventional trigger circuit will serve the purpose. For example, the Eccles-Jordan multivibrator circuit will work perfectly well if lead 31 controls the grid of one of the two tubes and lead 33 the other grid. Whenever a pulse appears on the grid connected to lead 31, it will cause that tube to conduct and cut off the tube associated with lead 33; contrariwise, whenever a pulse appears on the grid to which lead 33 is connected, it will cause that tube to conduct and cut off the tube associated with lead 31. As will be apparent from other exemplary embodiments of this invention, particularly the ones of FIGS. 3 and 5, a polarized relay or transistor flip-flop circuit works just as well.

Figure 4:
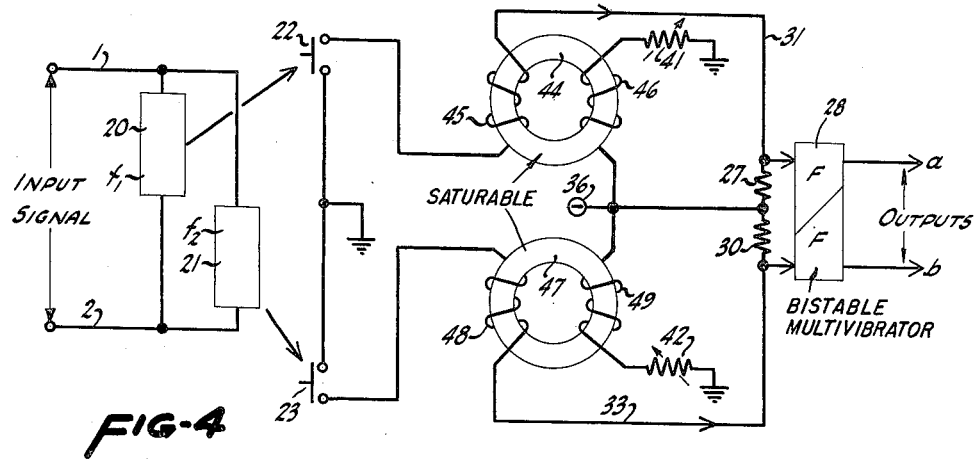
FIG. 4 is a schematic representation of a third exemplary embodiment of the invention for detecting one of two frequencies.
Figure 3:
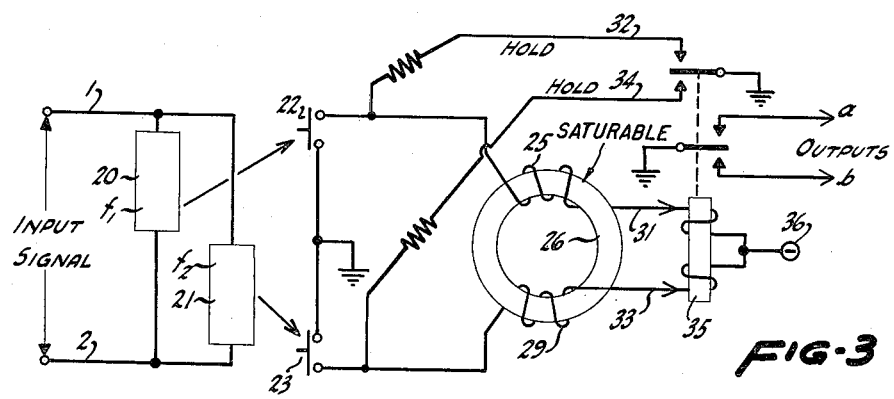
FIG. 3 is a schematic representation of a second exemplary embodiment of the present invention for detecting one of two frequencies.
Figure 6:
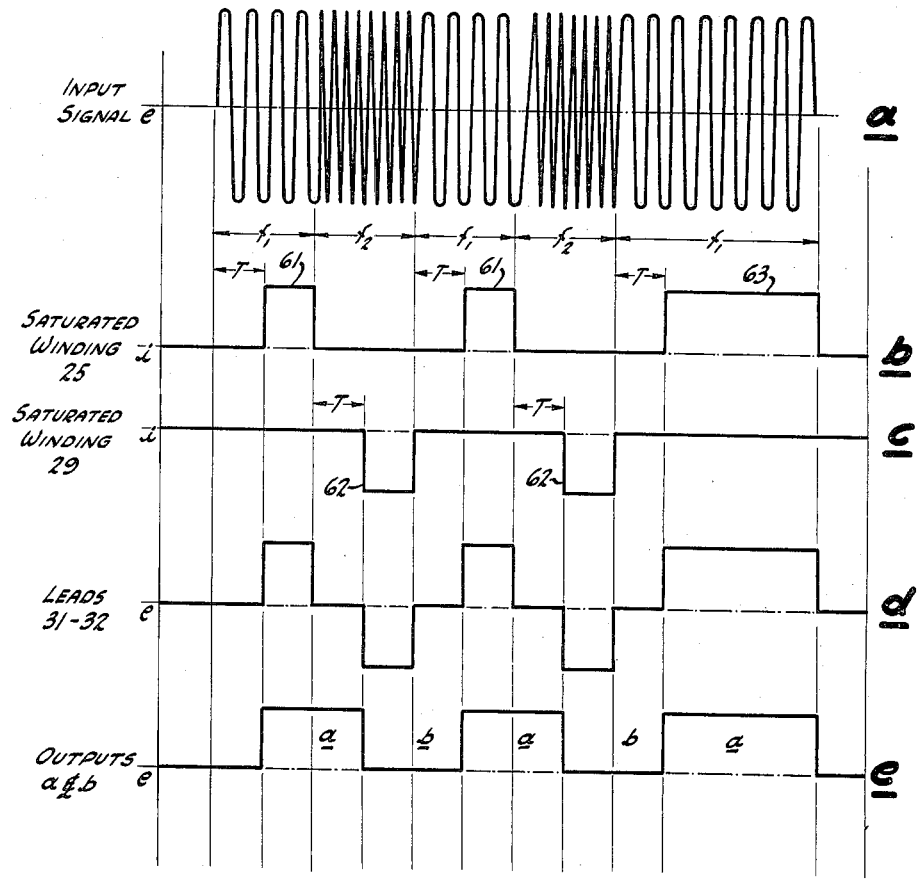
FIG. 6 shows five waveforms which represent voltage and current waveforms of the exemplary system of FIGS. 2 and 5.

The waveforms for the exemplary embodiment of FIG. 2, as well as those of FIGS. 3 and 4, are illustrated in FIG. 6, coordinated along a time axis. In FIG. 6 the uppermost curve $a$ illustrates a typical two-frequency input signal to the frequency detector circuit. In the dual frequency inband signaling system referred to earlier, the presence and absence of dial pulses might be indicated by signals of frequencies $f_1$ and $f_2$, respectively. Thus, the illustrated three bursts of frequency $f_1$ signal indicate two dial pulses, for example, followed by a longer pulse. Frequency $f_2$ is transmitted between the bursts of frequency $f_1$. The second curve $b$ illustrates along the coordinated time axis the current flowing in winding 25 of saturable core 26 and the third curve $c$ illustrates the current flowing through winding 29, neglecting the relatively small currents supplied through the hold circuits 32 and 34. As mentioned with regard to the hysteresis loop of FIG. 1, it takes a time period T for the saturable core to shift from a saturated condition of one polarity to that of the other polarity. Hence, the application of the $f_1$ signal starts the time delay T. As soon as this time delay has elapsed, the saturable core shifts and current 61 flows, providing a shift signal to multivibrator 28 via lead 31. Current 61 is substantially interrupted (reduced to the small value of current supplied through hold lead 32) when the $f_2$ signal appears and operates switch 23, switch 22 opening concurrently. Then, as indicated in the third curve $c$, after time delay T current 62 flows and provides a reshift signal to the multivibrator through lead 33. As the burst of frequency $f_1$ signal makes its appearance again, the current 62 is substantially interrupted by the opening of switch 23 and begins the time delay T which occurs prior to the increase of current 61 flowing in winding 25. This operation repeats until all bursts of alternating $f_1$ and $f_2$ signals are completed. In the case of the last burst of $f_1$ signal, after the time delay T the output current 63 continues for a time greater than 61 since the circuit which gives rise to it is maintained in a closed condition until the $f_1$ signal disappears. The fourth curve $d$ in FIG. 6 is a composite waveform of the voltage across leads 31 and 33. These output waveforms appear as alternate positive and negative pulses separated by the time delay T. The output signals on leads $a$ and $b$ of the FIG. 2 embodiment might appear similar to those illustrated in the lowermost curve $e$ of FIG. 6, which are dependent on the composite outputs depicted in the immediately preceding curve $d$. The waveforms at the outputs are identical in shape (and therefore only one is shown) but are of opposite polarity. Thus, the two short pulses and the longer pulse are reconstituted after being delayed by the time delay T of the saturable core 26.

Turning to the second embodiment of the invention disclosed as a partial schematic in FIG. 3, and wherein components comparable to those in FIG. 2 are given the same numbers, it can be seen to comprise input conductors 1 and 2 and series resonant circuits 20 and 21, tuned to frequencies $f_1$ and $f_2$, respectively. The presence of a signal of frequency $f_1$ at the input terminals causes current to flow in series resonant circuit 20 which actuates switch 22. This places ground on one side of the winding 25 of saturable core 26. The other terminal of winding 25 is connected to one terminal of one of the windings of polarized relay 35. The other terminal of the upper winding of relay 35 is connected to the negative terminal of a battery 36. Thus, whenever the switch 22 is closed, a circuit is completed through the upper winding of polarized relay 35 and windings 25 of saturable core 26. Provided switch 22 is maintained closed for a sufficient period of time greater than time delay T current flows through lead 31, winding 25 and the upper winding of relay 35 to operate relay 35 to its contacts 1 and 2. Whenever relay 35 is so operated, contact 1 places ground on lead $a$ and contact 2 provides a holding ground over lead 32 for winding 25. When the $f_1$ signal is removed from resonant circuit 20 and switch 22 opens, the holding ground via lead 32 maintains core 26 in its shifted saturated condition.

In a similar manner, whenever the presence of an $f_2$ signal appears at the input on conductors 1 and 2, current flows in the series resonant circuit 21 which in turn closes switch 23 to complete a circuit for winding 29 of the saturable core 26. This circuit includes lead 33, the lower winding of relay 35, and battery source 36. If this signal persists for a time in excess of T, current flows, core 26 shifts and relay 35 operates to its contacts 3 and 4. This interrupts the hold circuit for winding 25, completes a hold path for winding 29 of core 26 through contact 4 and over lead 34, and places ground via contact 3 on output lead $b$. Thus, the saturable core 26 reshifts from its shifted saturated condition back to its original negatively saturated condition. The next presence of an $f_1$ signal causes the core and the polarized relay associated therewith to repeat the operating shifts.

FIG. 4 discloses an alternate two-core embodiment wherein the means for biasing the cores to definite saturated conditions include auxiliary windings cooperating with two saturable cores. In this embodiment, a pair of saturable cores 44 and 47 having respective input windings 45 and 48 and respective bias windings 46 and 49 are used instead of a single core 26. One terminal of winding 45 and one terminal of winding 48 are connected respectively to one terminal of switch 22 and one terminal of switch 23 while the other terminals of windings 45 and 48 are connected through dropping resistors 27 and 30 to the negative terminal of a source of direct current voltage 36. The negative terminal of voltage source 36 is also connected to one terminal of each of bias windings 46 and 49 of cores 44 and 47. The other terminal of winding 46 is connected through a variable resistor 41 to ground. Similarly, the other terminal of winding 49 is connected through a variable resistor 42 to ground. And the terminals of windings 45 and 48 which are connected to dropping resistors 27 and 30 are also connected through leads 31 and 33 to the two inputs for the trigger circuit 28.

When current flows in resonant circuit 20 as a result of a sustained $f_1$ signal, so that switch 22 is maintained closed longer than the time delay T and core 44 shifts from its negative state to the positive state, substantial current flows in winding 45. After switch 22 is opened at the end of the $f_1$ signal, core 44 returns to its negatively saturated state due to the circuit of bias winding 46. Current flow in the input winding 45 of core 44 after the time delay lapse also shifts trigger circuit 28. In a similar manner, when switch 23 is closed as a result of an $f_2$ signal causing current to flow in resonant circuit 21, after time delay T, the core 47 shifts and current flows in winding 48 of core 47 to change the state of trigger circuit 28 back to initial conditions. Here, bias winding 49 returns the core 47 to its negatively saturated state after the burst of $f_2$ signal is interrupted. The windings 46 and 49 are poled and connected to sources of biasing voltage so that cores 44 and 47 return to their original saturation states in the absence of pulses.

Turning to FIG. 5, which discloses the exemplary embodiment of FIG. 2 in more detail, the operation may be explained broadly in a similar fashion. That is, the input signals between terminals 1 and 2 are directed into parallel connected series resonant circuits 20 and 21, the emitter-to-base impedances of the transistors 22 and 23 being negligible. If the input signal is of a frequency $f_1$, current flows through series resonant circuit 20 into the base of transistor 22. The biasing arrangement on transistor 22 and in its similar connected counterpart, transistor 23, is such that current flowing in the base of switching transistor 22 causes it to conduct and collector current flows in lead 32. This completes a path for the current through the winding 25 of the saturable core 26 and, after the time delay T during which the impedance to current flow is high because of the back voltage induced by the changing flux in the core, current flows through the winding 25 of saturable core 26, the core having shifted to its other saturated condition (positive in the assumed case). The current flowing in output lead 31 thereafter is fed into an output transformer 71 and from there to the trigger circuit 28. On the other hand, whenever an input signal of frequency $f_2$ is detected by series resonant circuit 21, transistor 23 conducts and a current path through lead 34 is completed. This current, after a time delay T, causes saturable core 26 to reshift to its original saturated condition. After the shift, current flows through winding 29 and in output lead 33. Output leads 31 and 33 are connected to the two terminals of the transformer 71, the secondary of which is connected to the conventional bistable multivibrator or trigger circuit 28.

More particularly, the alternating current flowing through resonant circuit 20 to the base of transistor 22 causes a unidirectional current to flow in the collector circuit including lead 32. Current flowing in lead 32 charges capacitor 51 and starts timing the time delay of saturable core 26 via winding 25. Capacitor 51 in parallel with the winding 25 is provided with a discharge path including resistors 52, 53, and 54.

As soon as the time delay T has passed, current flows through the winding 25 and in output lead 31. The output of the trigger circuit 28 is connected via lead 32 to the input terminal of winding 25 to maintain core 26 in its shifted saturated condition.

As the current flows through series resonant circuit 21 as a result of an $f_2$ signal across conductors 1 and 2, it causes transistor 23 to conduct and therefore collector current flows unidirectionally in lead 34. Current flowing in lead 34 charges capacitor 55 which later discharges through resistors 52, 53 and 56 in a manner similar to that of capacitor 51. As soon as time delay T expires and core 26 has been shifted to its original saturated state, current flows through winding 29 and in lead 33, the latter of which is connected to the input winding of the coupling transformer 71.

The current flowing in leads 31 and 33, respectively, approximate the waveform depicted at $b$ and $c$ in FIG. 6 of the accompanying drawings. And, a typical input across the resonant circuits 20 and 21 might appear as depicted in FIG. 6 at the topmost curve $a$.

The output winding of coupling transformer 71 is connected to a more or less conventional transistor bistable circuit 28 including a pair of transistors 72 and 73 connected in a common emitter circuit. The base of transistor 72 is tied to the collector of transistor 73 and the base of transistor 73 is tied to the collector of transistor 72 through resistors as shown. The result of this circuit arrangement is such that whenever current flows in lead 31 it shifts the trigger circuit 28 to the stable state in which transistor 72 is conducting. This provides an output on signal output lead $a$ as well as a bias circuit via lead 32 to maintain the winding 25 at its shifted saturated state. Since the trigger circuit 28 is a bistable circuit, it maintains its shifted condition with transistor 72 conducting and transistor 73 cut off until switch 23 is closed (i.e., the transistor 23 conducts collector current) to cause current to flow in lead 33 after time delay T. The flow of current in lead 33 causes the trigger circuit 28 to shift conductive states so that transistor 73 conducts and 72 is cut off. This causes an output pulse to appear on output lead $b$ and supplies a bias current of the correct polarity via lead 34 to winding 29 of the saturable core 26.

While the FIG. 2 embodiment is described in more detail with reference to FIG. 5, no comparable detailed descriptions of the FIGS. 3 and 4 embodiments seem necessary since the specific type of trigger circuit 28 is not important to a proper functioning of the invention, and the cooperation of switching transistors 22 and 23 with the saturable cores is similar in all three embodiments.

Figure 8:
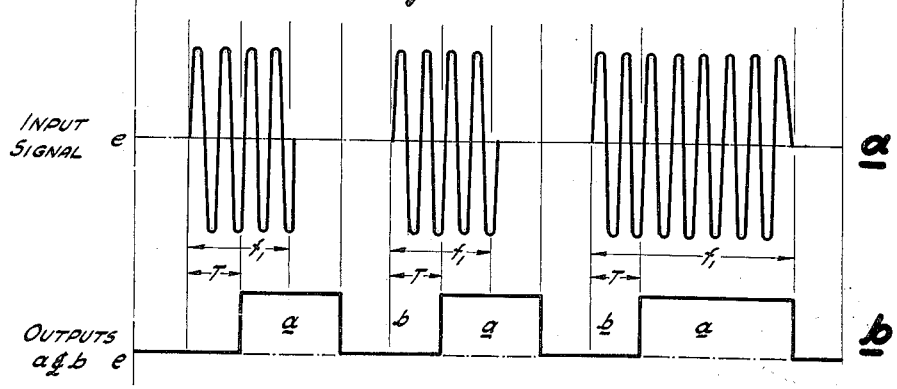
FIG. 8 depicts two voltage waveforms of the exemplary embodiment of FIG. 7.

FIGS. 7 and 8 relate to yet another embodiment of the present invention, more particularly to a single frequency detector circuit. This embodiment, shown in detail in FIG. 7, represents a modification of the dual frequency system depicted in FIG. 5 and described in some detail. Since it differs in only a few particulars from the dual frequency circuit, like parts have been given like numbers and the description to follow represents an extension of the description of the FIGS. 2 and 5 embodiment.

The input to the single frequency detector is at terminals 1 and 2 through a single series resonant circuit 20, tuned to $f_1$ signals. Switching transistor 23 is biased to a normally conducting state by a resistor 81 which connects the collector of transistor 22 to the base of transistor 23. This maintains the circuit through winding 29 of core 26 normally closed, and thus biases core 26 to its negatively saturated state. The circuit including winding 29 is similar to that described in connection with the FIG. 5 embodiment.

When current flows in the base of transistor 22, it completes a circuit including winding 25, as previously identified. The transistors 22 and 23 are biased by the connection through resistor 81 so that only one of them can be conducting at one time, hence when transistor 22 conducts, transistor 23 is cut off. This opens the circuit for winding 29 and, after time delay T, the core 26 shifts to its positive saturated state. However, in this circuit, it is undesirable for the core 26 to remain positively saturated after transistor 22 cuts off; therefore, the core 26 returns to its negative state under the influence of winding 29 after current flow in resonant circuit 20 ceases.

The output from the transformer 71 and trigger circuit 28 are similar to those of the FIG. 5 circuit, although the trigger circuit is not needed to supply a holding ground to the saturated core 26. The waveforms are illustrated in FIG. 8. The incoming signal of $f_1$ frequency is depicted in FIG. 8 by the upper waveform $a$, while the lower waveform $b$ represents the reconstructed pulses on output leads $a$ and $b$.

A review of the operation of the preferred embodiments of the present frequency selective or detector circuits indicates that the principal means employed as a guard action is based on a time delay T plus a memory feature. The saturable cores of the present invention act to provide a delay in the order of 20 milliseconds or so, and during this time, the changing flux in the core blocks the flow of current by inducing a back voltage, whereby the winding temporarily has a high impedance. Provided the circuit including one or the other of the series resonant circuits 20, 21 is maintained closed for a time in excess of the built-in delay time, current flows therethrough after the core shifts to its other saturated condition. The memory feature is used to maintain the core in its most recent saturated state until the presence of a sustained current flowing in the other of the series resonant circuits is detected. This reshifts the core to its original saturated state.

As noted above, it is desirable that the signaling frequencies be as close to each other as possible since it improves the guarding action. Random noise theory indicates that the probability of alternation between two frequency components of random noise or other disturbances increase as the frequencies are close together. This being true, by choosing the frequencies as close together as possible the probability of alternation between the frequency $f_1$ and $f_2$ is enhanced. Thus, short transient bursts of current through one or the other of the signaling channels, due to random noise cannot cumulatively operate the core 26 because the alternate switching desaturates the partial saturation which results from the random noise signals. The practical limit to the proximity of the frequencies arises from the distortion introduced by rapid switching between separate oscillators. Of course, this bias distortion can be avoided by employing a single oscillator that is switched between two frequencies.

It has been found in one particular application of this receiver circuit to an inband signaling system that frequencies of 3000 and 3300 c.p.s. work quite well. Distortion is less than ±7%. A better compromise appears to be 2700 and 3300 c.p.s. These are close enough to provide good guard action and, at the same time, maintain a distortion level of less than 3%. Actually, unless the present invention is used in a dual frequency inband signaling system for telephone applications, the distortion may be no problem.

In the present description of exemplary inventions, it should be apparent that the incoming pulses to the system cannot be of such short duration that they are shorter in time than the core delay T. Otherwise, the saturable core will never shift from one state to the other thereby to permit current to flow in the windings. Within this limitation, the input signal rate may be altered at will. It will also be noted that in the foregoing description, it has been assumed that bursts of one frequency are immediately followed by bursts of the other frequency (in the case of the dual frequency circuit). If this is not true it can cause some problem in the frequency detecting and translating function of the present receiver circuits for some uses. However, the correction of non-continuities between the signaling frequencies is one which must be solved ordinarily at the transmitting station, not at the receiver. In my copending application, filed on an even date herewith and more fully identified above, a transmitting system is disclosed and claimed which may operate in conjunction with frequency detector circuits as herein described. In this copending application, the problem of gaps between frequency signals is discussed, and means are provided to insure that the alternating bursts of one frequency are followed immediately by alternating bursts of the other.

While the present invention has been described in detail with respect to single and dual frequency circuits and variants thereof, it should be apparent to those skilled in the art that the basic concept is the use of saturable core time delays and memory means associated therewith—all for the purpose of devising a highly selective frequency detector for any one of a myriad of uses. Numerous other arrangements will be apparent to those skilled in the art without departing from the intended scope of the invention. It is herefore apparent that the present invention should not be limited except by the appended claims.

What is claimed is:

1. A signal detector responsive only to signals of selected frequency and duration, comprising an electrical switching device having conductive and less-conductive states, means for actuating said switching device to one of said states responsive only to the presence of a signal of a selected frequency and to the other of said states responsive to the absence of said signal, a D.-C. voltage source and a saturable reactor including a winding connected in series with said source and with said switching device, said source being connected and of sufficient voltage to drive the reactor from magnetic saturation in one polarity to magnetic saturation in the opposite polarity when the switching device remains in said conductive state for a time equal to the selected duration, means for resetting said reactor to said one polarity of magnetic saturation while the switching device is in said less-conductive state, and output means connected to said reactor winding and responsive to reversal of the polarity of said reactor's magnetization.

2. A signal detector responsive to electric signals of selected frequency and duration, comprising a resonant circuit connected to receive the signals and tuned to the selected frequency, first and second electrical switching devices each having conductive and less-conductive states, means for actuating said first switching device to its conductive state responsive to the presence of the signal of selected frequency in said resonant circuit and to its less-conductive state responsive to the absence of said signal, means for actuating said second switching device to the state opposite that of the first switching device, a D.-C. voltage source, a saturable magnetic core having first and second windings thereon, said first winding being connected in series with said source and said first switching device, said second winding being connected in series with said source and said second switching device, said windings being in bucking relation to each other and connected to magnetize said core in one polarity when the second switching device is in said conductive state and in the opposite polarity when the first switching device is in said conductive state, said source being of sufficient voltage to drive said core from magnetic saturation in said one polarity to magnetic saturation in said opposite polarity when the first switching device remains in said conductive state for a time equal to the selected duration, and a bistable device connected to be triggered from one state to another by the flow of unequal currents through said windings.

3. A signal detector responsive to electric signals of two selected frequencies and a selected duration, comprising input terminals for the signals, first and second series-resonant circuits tuned respectively to first and second ones of the two selected frequencies, first and second transistors each having an emitter and a base and a collector, said first resonant circuit being connected in series with the base and emitter of said first transistor to said input terminals, said second resonant circuit being connected in series with the base and emitter of said second transistor to said input terminals, a D.-C. voltage source, a saturable magnetic core having first and second windings thereon, said first winding being connected in series between said source and the collector of said first transistor, said second winding being connected in series between said source and the collector of said second transistor, said windings being in bucking relation to each other with respect to magnetization of said core, and a bistable multivibrator having two inputs connected respectively to said first and second windings and responsive to the flow of current therein.

4. A signal detector responsive to electric signals of two selected frequencies and a selected duration, comprising first and second resonant circuits connected to receive the signals and tuned respectively to first and second ones of the two selected frequencies, first and second electrical switching devices each having conductive and less-conductive states, means for actuating said first switching device to its conductive state responsive to the presence of the signal of first selected frequency in said first resonant circuit and to its less-conductive state in the absence of such signal, means for actuating said second switching device to its conductive state responsive to the presence of the signal of second selected frequency in said second resonant circuit and to its less-conductive state in the absence of such signal, a D.-C. voltage source, a saturable magnetic core having first and second windings thereon, said first winding being connected in series with said source and said first switching device, said second winding being connected in series with said source and said second switching device, said windings being in bucking relation to each other and connected to magnetize said core in one polarity when the second switching device is in said conductive state and in the opposite polarity when the first switching device is in said conductive state, said source being of sufficient voltage to drive said core from magnetic saturation in one polarity to magnetic saturation in the opposite polarity when the first switching device remains in its conductive state for a time equal to the selected duration, and a bistable device connected to be triggered from one state to another by the flow of unequal currents through said windings.

5. A signal detector responsive to electric signals of one selected frequency and a selected duration, comprising input terminals for the signals, a series-resonant circuit tuned to the selected frequency, first and second transistors each having an emitter and a base and a collector, said resonant circuit being connected in series with the base and emitter of said first transistor to said input terminals, whereby said first transistor is actuated to a conductive state responsive to the presence of the signal of selected frequency and to a less-conductive state in the absence of such signal, means connecting the two transistors together for automatically actuating said second transistor to a conductive state whenever the first transistor becomes less conductive and to a less-conductive state whenever the first transistor becomes more conductive, a D.-C. voltage source, a saturable magnetic core having first and second windings thereon, said first winding being connected in series between said source and the collector of said first transistor, said second winding being connected in series between said source and the collector of said second transistor, said windings being in bucking relation to each other with respect to magnetization of said core, and a bistable multivibrator having two inputs connected respectively to said first and second windings and responsive to the flow of current therein.

References Cited in the file of this patent

UNITED STATES PATENTS

| | | |
|---|---|---|
| 1,829,836 | Newby | Nov. 3, 1931 |
| 2,272,998 | Bjornson | Feb. 10, 1942 |
| 2,661,453 | Hemingway et al. | Dec. 1, 1953 |
| 2,795,706 | Barker | June 11, 1957 |
| 2,798,168 | Bonn et al. | July 2, 1957 |
| 2,881,268 | Spencer | Apr. 7, 1959 |
| 2,894,180 | Price | July 7, 1959 |
| 2,909,674 | Moore et al. | Oct. 20, 1959 |
| 2,966,595 | Williams | Dec. 27, 1960 |
| 2,983,905 | Buser et al. | May 9, 1961 |